United States Patent [19]

Coste et al.

[11] Patent Number: 4,595,774

[45] Date of Patent: Jun. 17, 1986

[54] GASEOUS-SOLID REACTION

[75] Inventors: Camille Coste, Ceret; Georges Crozat; Sylvain Mauran, both of Perpignan, all of France

[73] Assignee: Societe Nationale Elf Aquitaine, Courbevoie, France

[21] Appl. No.: 620,069

[22] Filed: Jun. 13, 1984

[30] Foreign Application Priority Data

Jun. 15, 1983 [FR] France ................. 83 09885

[51] Int. Cl.$^4$ .............. C07F 3/06; C07C 59/90; C07C 62/32; C07C 65/40
[52] U.S. Cl. .................... 556/118; 564/463
[58] Field of Search ........... 260/429.9; 564/463; 556/118; 423/448

[56] References Cited

U.S. PATENT DOCUMENTS

| | | | |
|---|---|---|---|
| 1,867,962 | 7/1932 | Allchin | 260/429.9 |
| 1,923,697 | 8/1933 | Alt | 260/429.9 |
| 2,020,690 | 11/1935 | Lauter | 260/429.9 |
| 2,080,143 | 11/1937 | Lubs et al. | 260/429.9 X |
| 2,492,939 | 12/1949 | Schertz | 260/429.9 X |
| 2,513,793 | 7/1950 | Frommel | 260/429.9 X |
| 2,686,798 | 8/1954 | Gmitter | 260/429.9 |
| 3,249,540 | 5/1966 | Gee et al. | 260/429.9 X |
| 3,296,287 | 1/1967 | Meyer | 260/429.9 X |
| 3,355,466 | 11/1967 | Elkin | 260/429.9 |
| 3,395,121 | 7/1968 | Pfann et al. | 564/463 X |
| 3,471,250 | 10/1969 | Langer | 564/463 X |
| 3,483,219 | 12/1969 | Shepherd, Jr. | 564/463 X |
| 3,549,560 | 12/1970 | Monsimer | 564/463 X |
| 3,755,448 | 8/1973 | Merianos et al. | 260/429.9 X |
| 3,786,128 | 1/1974 | Murib et al. | 564/463 |

*Primary Examiner*—Helen M. S. Sneed
*Attorney, Agent, or Firm*—Weiser & Stapler

[57] ABSTRACT

The invention has for its object an improved method of performing gas-solid reactions.

The method is characterized in that there is added expanded graphite of a volumetric mass between 0.001 and 0.02 g/cm$^3$ to the reactive medium and in such quantity that it constitutes from 1 to 60% of the quantity of reactant solid present in the medium.

The method makes it possible to improve the rate of the gas-solid reactions, as well as their stoichiometric characteristics, particularly in the case of reversible reactions.

19 Claims, No Drawings

GASEOUS-SOLID REACTION

The present invention has as its object an improved method of performing chemical reactions of the gas-solid type, permitting a higher reaction rate and improved stoichiometric reaction characteristics.

The endothermic or exothermic chemical reactions between a solid and a gas are generally slow and impeded essentially by two factors, diffusion and conductivity. Indeed, one limiting factor is poor diffusion capability of the gas within the bed of solid particles which react with the gas. During the first phase of the reaction, one frequently observes a swelling of the solid which may not be negligible. Such volume enlargement in the order of 4 to 5 times, is observable with alkaline, earth-alkaline or metallic halogenides with gasses like ammonia or its derivatives, or with alcohols.

The time which the gas takes towards the end of the stoichiometric reaction to reach the reaction site becomes very long or the reaction may even not be terminated at all. In cases where there are carried out several back-and-forth reactions, settlement of the bed can also occur, reducing the stoichiometric characteristics further or prolonging the reaction time. Another limiting factor is the poor thermal conductivity of the particles of the bed. The solids such as halogens, pseudohalogens, sulfates, nitrates, phosphates, and others are very poor conductors. For example, during the exothermic reaction between a solid and a gas, if the solid is at a temperature $T_A$, it will react at the rate $v_A$. If the reactive medium is a poor conductor and is not able to rapidly dissipate the calories which are produced, the temperature of the solid will rise up to $T_B$ which is much closer to the conditions of equilibrium, so as to cause a rate $V_B$ which is much slower than $v_A$. The temperature can thus rise up to thermodynamic equilibrium conditions, that is, to zero reaction rate. This, in fact, even demonstrates how the reaction can be slowed down, stopped, or be reversed.

The means commonly used to overcome these disadvantages are:

a small charge of the solid relative to the volume of the reactor used enabling easy diffusion of the gas within the reactive medium, a very large exchange surface relative to a given volume of solid reactant, allowing the removal of the calories or on the contrary, a feeding of calories for the endothermic reactions.

These means are particularly inefficient in terms of the reactor volume and in terms of dimension the of the solid exchange medium.

The present invention has as its object to overcome these disadvantages by enabling an improvement of the gas diffusion in the heart of the reactive medium and an improvement in the thermal conductivity of the solid portion of the reactive medium.

The present invention has for its object an improved method of performing chemical reactions of the gas-solid type, characterized in that there is added to the reaction medium expanded graphite of a volumetric mass between 0.001 and 0.02 g/cm$^3$. The quantity of expanded graphite added to the medium is generally between 1 and 60% (by weight) of the quantity of reactive solid present in the reactive medium.

The expanded graphite is a graphite obtained by heating of graphite complexes which are prepared from natural graphite.

Natural graphite in flakes is capable of absorbing under certain conditions, numerous chemical compounds or their mixture. These insert themselves between the leaflets of the graphite network to form the graphite complexes.

By way of example of chemical compounds capable of forming complexes with the natural graphite, there can be mentioned:

nitric acid (HNO$_3$)
sulfuric acid (H$_2$SO$_4$)
hydrofluoric acid (HF)
orthophosphoric acid (H$_3$PO$_4$)
ferric chloride (FeCl$_3$)
trifluoroacetic acid (CF$_3$CO$_2$H)
ferric chloride/ammonia (FeCl$_3$/NH$_3$)
antimony pentachloride (SbCl$_5$)
calcium/ammonia (Ca/NH$_3$)
barium/ammonia (Ba/NH$_3$)
strontium/ammonia (Sr/NH$_3$)

Of course, it is also possible to use a mixture of these compounds to produce the graphite complex.

These compounds are capable of exfoliating or expanding their graphite flakes when exposed to a temperature above 150° C., thereby yielding an expanded graphite of low volumetric mass.

The expansion of the graphite is generally such that the volume of the expanded graphite is between 20 and 300 times the volume of the treated graphite complex. The coefficient of expansion depends both on the nature of the complex and on the temperature of expansion.

It will frequently be advantageous to perform the expansion at a temperature between 180° and 250° C.

The volumetric mass of the expanded graphite employed in the method of the invention will generally be between 0.001 and 0.02 g/cm$^3$, and preferably between 0.005 and 0.015 g/cm$^3$.

For the method of the invention to reach its maximum efficiency, it is desirable to provide a thorough mixture of the expanded graphite and of the reactive solid so as to distribute the expanded graphite throughout the bed of reactive solid.

The process of the invention for making the mixtures can be carried out in several ways as described below. For example, the reactive solid can be mixed with the expanded graphite in variable proportions. The reactive solid can be raised to the temperature necessary for expansion, for example between 180° to 250° C. The expansion of the complex graphite then takes place freely. In a variant of the preceding method, one is able to mix the reactant solid with the graphite complex in variable proportions, the solid being previously treated in such manner that when raised to the expansion temperature between 180° to 250° C., for example, it completely loses the additive reactant, water or all gas with which it is capable of reacting. The entire product is then raised to that temperature, wherein the expansion is able to take place freely.

Such procedures can be carried out within the heart of the reactor itself where the gas-solid reaction takes place.

The quantity of expanded graphite introduced into the reactive medium depends, of course, on the one hand on the nature of the gas-solid chemical reaction performed, and on the other, on the type and property of the expanded graphite which is selected. This quantity expressed in volumes relative to the volume of the reactive solid, will generally be between about 1 and about 60%. However, it must be noted, as is shown by the examples below, that very good results are obtained within the range from 5 to 30%.

The mixture of the expanded graphite with the reactive solid provides important advantages in the method. The use of expandable graphite with very high specific surface and which is present in the form of flakes, permits diffusion of the gas even in a confined medium.

The thermal conductivity of the mixture (from 120 to 200 $Wm^{-1} \times K^{-1}$ depending on the nature of the reactive solid and on the respective proportions of solid and graphite), is considerable. It is of the order of good to very good metal conductors which are heat conductive.

The method of the invention is especially well adapted to the performance of reversible gas-solid reactions performed in cycles, such as those which are used for chemical energy storage or for chemical heat pumps. Indeed, a system, made of gas and of a mixture of expanded graphite and reactive solid, can have a high energy density due to the high confinement, and can function at high power due to the high rate and by means of a small exchange surface.

The following examples given by way of illustration and not limitation, illustrate the invention.

For these examples, there was carried out the synthesis and decomposition reactions between alkaline earth or alkaline earth metal chlorides and a derivative of ammonia in a reactor without internal exchanger, the heat exchanges taking place only by means of the reactor walls. The quantities of reactive solid of the order of 300 g are placed in a reactor of 0.4 $dm^3$.

EXAMPLES 1 to 6

In these examples, there has been performed the synthesis reaction between $CaCl_2$ and methylamine:

$$CaCl_2 \cdot _{(s)} 2NH_2CH_3 + 4_{(g)}NH_2CH_3 \rightarrow CaCl_2 \cdot 6_{(s)}NH_2CH_3 + \Delta H$$

with mixtures of 0 to 50% of expanded graphite.

The temperature of the solid was 30° C. and that of the methylamine container 20° C.

The expanded graphite used in examples 1-6, and the following examples was obtained by exfoliation of a sulfate graphite complex containing 8% sulfuric acid, at a temperature of 200° C. The expanded graphite has a volumetric mass of 0.01 g/$cm^3$.

The results obtained are summarized in Table 1 below.

TABLE 1

| Example No. | (% by weight) graphite | Completed reaction (duration Hrs) | Energy density max. Kwh/$m^3$ | Average power W/kg $CaCl_2$ |
|---|---|---|---|---|
| 1 | 0 | 10 | 198 | 50 |
| 2 | 5 | 8.75 | 185 | 59 |
| 3 | 15 | 6.25 | 160 | 76 |
| 4 | 25 | 4 | 136 | 124 |
| 5 | 35 | 2.9 | 115 | 166 |
| 6 | 50 | 2.4 | 83 | 250 |

The values of power (calories) were measured by calorimetry by measuring the inlet and exit temperatures at the reactor and by determining from the measurement of the flow-rate of the calorie-transporting fluid, and enthalpic balance of the reaction. Of course, this is done after having experimentally determined the heat capacity of the reactor containing the solid and its accessories.

There is observed, under identical experimental conditions, a reduction in the total reaction time from 10 to 2.4 hours, as well as a change in the exothermic power from 50 to 250 W/kg $CaCl_2$.

EXAMPLES 7-12

In these examples there was carried out the above-described reaction, but in the reverse direction.

$$CaCl_2 \cdot 6NH_2CH_3 \rightarrow CaCl_2 \cdot 2NH_2CH_3 + 4NH_2CH_3 + \Delta H$$

The experimental conditions are identical. The results obtained are summarized in Table 2 below.

TABLE 2

| Example No. | Percentage of expanded graphite (% by weight) | Completed reaction (duration Hrs) | Energy density max. Kwh/$m^3$ | Average power W/kg $CaCl_2$ |
|---|---|---|---|---|
| 7 | 0 | 10 | 198 | 26 |
| 8 | 5 | 8.25 | 185 | 30 |
| 9 | 15 | 6.30 | 160 | 40 |
| 10 | 25 | 4 | 136 | 65 |
| 11 | 35 | 2 | 115 | 129 |
| 12 | 50 | 1.5 | 83 | 173 |

There is noted that under identical experimental conditions, a reduction in the total reaction time from 10 hours to 1.5 hours, that is as a change in the endothermic power from 26 to 173 W/kg $CaCl_2$.

It must be noted that, in these experiments, due to the volume occupied by the expanded graphite, its addition causes a reduction of the energy density, that is, the calories which it is possible to extract from the reaction per unit volume of solid.

EXAMPLE 13

In this example, there is performed the following synthesis between $ZnCl_2$ and methylamine:

$$ZnCl_2, 4NH_2CH_3 + 2NH_2CH_3 \rightarrow ZnCl_2 \cdot 6NH_2CH_3 + \Delta H$$

with mixtures of none to 50% of expanded graphite.

There is noted for identical experimental conditions, a reduction in the total reaction time from 14 hours (0%) to 1.42 hours, i.e., a change in the power of the exothermic reaction from 11 to 108 W/kg of $ZnCl_2$.

EXAMPLE 14

In this example, there is performed the same reaction as in Example 13, but in the reverse direction.

There is observed, for identical experimental conditions, a reduction in the total reaction time from 2.5 hours to less than 6 minutes, as well as an increase in the power of the endothermic reaction from 42 to more than 1,000 W/kg $ZnCl_2$.

EXAMPLE 15

The reactions described in Examples 1-12 were repeated 170 times in identical operating conditions with a mixture of 20% graphite. The reaction rates were noted during these cycles. No perceptable reduction was observed.

Another advantage of the invention is the fact that the reactive mixture of the solid and expanded graphite and the gas can be carried out numerous times in the same reactor.

One can see from these examples the advantage which is provided by the use of expanded graphite outside the reactive medium or inside the reactive medium to increase the reaction rate between a solid and a gas. The thermal energy which one can introduce or extract from such reactions is multiplied by 5 or by 24 depending on the situation.

The use of such mixtures enables very high appreciable reduction of the volume of the solid reactant and a very substantial reduction of the exchange surfaces in the solid-gas reactors.

We claim:

1. In a method of performing a reversible reaction of the gas-solid type which is performed in cycles which are used in chemical energy storage systems or chemical heat pumps, the improvement which comprises adding expanded graphite of a volumetric mass between 0.001 and 0.02 $g/cm^3$ in the reactive medium in an amount between about 1 and about 60% by weight of the quantity of reactive solid present.

2. The method of claim 1 wherein the expanded graphite is prepared by exfoliation of a graphite complex at a temperature equal at least to 150° C.

3. The method of claim 1 wherein the expanded graphite in the reactive medium is distributed over the whole of the bed of solid reactant.

4. The method of claim 1 wherein the graphite is added to the reactive medium as a graphite complex and is expanded in situ by heating of the reactive medium.

5. In a reversible gas-solid reaction in a system for a chemical heat pump or for chemical energy storage in which in a reactive medium there is carried out the synthesis and/or decomposition reactions between alkaline earth or alkaline earth metal chlorides and a derivative of ammonia, the improvement which comprises including expanded graphite or a graphite complex in the reactive medium in an amount whereby about 1 to about 60% of the quantity of the reactive solid present in the reactive medium is expanded graphite.

6. The method of claim 5 wherein said reaction medium contains the graphite complex, said graphite complex being heated so as to form an expanded graphite in situ medium.

7. The method of claim 5 wherein said expanded graphite is in the form of flakes.

8. The method of claim 5 wherein said graphite complex is a complex of natural graphite and an acid selected from the group consisting of nitric acid, sulfuric acid, hydrofluoric acid, orthophophoric acid and trifluoroacetic acid.

9. The method of claim 5 wherein said graphite complex is a complex of natural graphite and a member selected from the group consisting of feric chloride and antimony pentachloride.

10. The method claim 5 wherein said graphite complex is a complex of natural graphite and a member selected from the group consisting of ferric chloride/ammonia, barium/ammonia and strontium/ammonia.

11. The method of claim 5 wherein the expanded graphite in said reactive medium has a volumetric mass between 0.001 and 0.02 $g/cm^3$.

12. The method of claim 11 wherein the volumetric mass is between 0.005 and 0.015 $g/cm^3$.

13. The method of claim 5 wherein the reaction is between calcium chloride and methylamine.

14. The method of claim 5 wherein the reaction is between zinc chloride and methylamine.

15. The method of claim 5 wherein the expanded graphite is formed in situ.

16. The method of claim 1 wherein said expanded graphite is formed by heating a graphite complex.

17. The method of claim 16 wherein said graphite complex is admixed with the reactive medium.

18. The method of claim 16 including heating said mixture after admixture so as to form said expanded graphite.

19. The method of claim 18 wherein said mixture is heated to a temperature between about 180° to about 250°.

* * * * *